(12) United States Patent
Jones (10) Patent No.: US 11,351,661 B1
(45) Date of Patent: Jun. 7, 2022

(54) COMBINED BATTERY JUMPER CABLE AND WRENCH

(71) Applicant: Douglas Jones, Columbia, SC (US)

(72) Inventor: Douglas Jones, Columbia, SC (US)

( * ) Notice: Subject to any disclaimer, the term of this patent is extended or adjusted under 35 U.S.C. 154(b) by 64 days.

(21) Appl. No.: 16/889,919

(22) Filed: Jun. 2, 2020

(51) Int. Cl.
  *B25B 13/48* (2006.01)
  *H02J 1/10* (2006.01)
  *B25B 23/00* (2006.01)
  *B25B 13/46* (2006.01)

(52) U.S. Cl.
  CPC ............ *B25B 13/48* (2013.01); *B25B 13/463* (2013.01); *B25B 23/0007* (2013.01); *H02J 1/122* (2020.01)

(58) Field of Classification Search
  CPC ... B25B 13/48; B25B 13/463; B25B 23/0007; B25B 27/0035; B25B 27/005; H02J 1/122; B25F 1/00; H01R 11/26; H01R 11/281; H01R 11/282; H01R 11/283; H01R 11/24
  USPC .......................................................... 11/282
  See application file for complete search history.

(56) References Cited

U.S. PATENT DOCUMENTS

| 820,866 | A | | 5/1906 | Harris | |
|---|---|---|---|---|---|
| 2,020,052 | A | | 11/1935 | Fischer | |
| 3,988,051 | A | * | 10/1976 | Robinson | H01R 4/64 439/772 |
| 4,477,937 | A | | 10/1984 | Costello | |
| 4,620,767 | A | | 11/1986 | Woolf | |
| D304,928 | S | | 12/1989 | Mize | |
| 4,913,668 | A | * | 4/1990 | Chamberlain | H01R 11/24 439/217 |
| 5,037,335 | A | | 8/1991 | Campbell | |
| 5,467,672 | A | * | 11/1995 | Ashby | B25B 13/08 81/58.2 |
| 9,819,113 | B2 | | 11/2017 | Adams | |
| 2016/0375573 | A1 | * | 12/2016 | Huang | B25G 1/043 81/177.2 |

FOREIGN PATENT DOCUMENTS

KR        200332726 Y1 *  11/2003

* cited by examiner

*Primary Examiner* — Anne M Kozak
*Assistant Examiner* — Tyler James McFarland
(74) *Attorney, Agent, or Firm* — Kyle A. Fletcher, Esq.

(57) ABSTRACT

The combined battery jumper cable with wrench is configured for use with a vehicle. The combined battery jumper cable with wrench forms an electric termination that attaches a cable to a terminal post of the vehicle battery. The combined battery jumper cable with wrench forms a ratchet that is used to attach an electrical terminal of the vehicle to the terminal post of the vehicle battery. The combined battery jumper cable with wrench includes a working head, a transfer mount, and a motive structure. The transfer mount attaches the motive structure to the working head. The working head is the working element of the tool. The motive structure transfer externally provided energy to the working head through the transfer mount. The motive structure removably attaches to the transfer mount.

10 Claims, 5 Drawing Sheets

COMBINED BATTERY JUMPER CABLE AND WRENCH

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of performing operations and shaping, more specifically, a wrench of the ratchet type. (B25B13/46)

SUMMARY OF INVENTION

The combined battery jumper cable with wrench is a tool. The combined battery jumper cable with wrench is configured for use with a vehicle. The combined battery jumper cable with wrench forms an electric termination that attaches a cable to a terminal post of the vehicle battery. The combined battery jumper cable with wrench forms a ratchet that is used to attach an electrical terminal of the vehicle to the terminal post of the vehicle battery. The combined battery jumper cable with wrench comprises a working head, a transfer mount, and a motive structure. The transfer mount attaches the motive structure to the working head. The working head is the working element of the tool. The motive structure transfer externally provided energy to the working head through the transfer mount. The motive structure removably attaches to the transfer mount. The motive structure is selected from the group consisting of the electric cable and the motive lever.

These together with additional objects, features and advantages of the combined battery jumper cable with wrench will be readily apparent to those of ordinary skill in the art upon reading the following detailed description of the presently preferred, but nonetheless illustrative, embodiments when taken in conjunction with the accompanying drawings.

In this respect, before explaining the current embodiments of the combined battery jumper cable with wrench in detail, it is to be understood that the combined battery jumper cable with wrench is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the combined battery jumper cable with wrench.

It is therefore important that the claims be regarded as including such equivalent construction insofar as they do not depart from the spirit and scope of the combined battery jumper cable with wrench. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
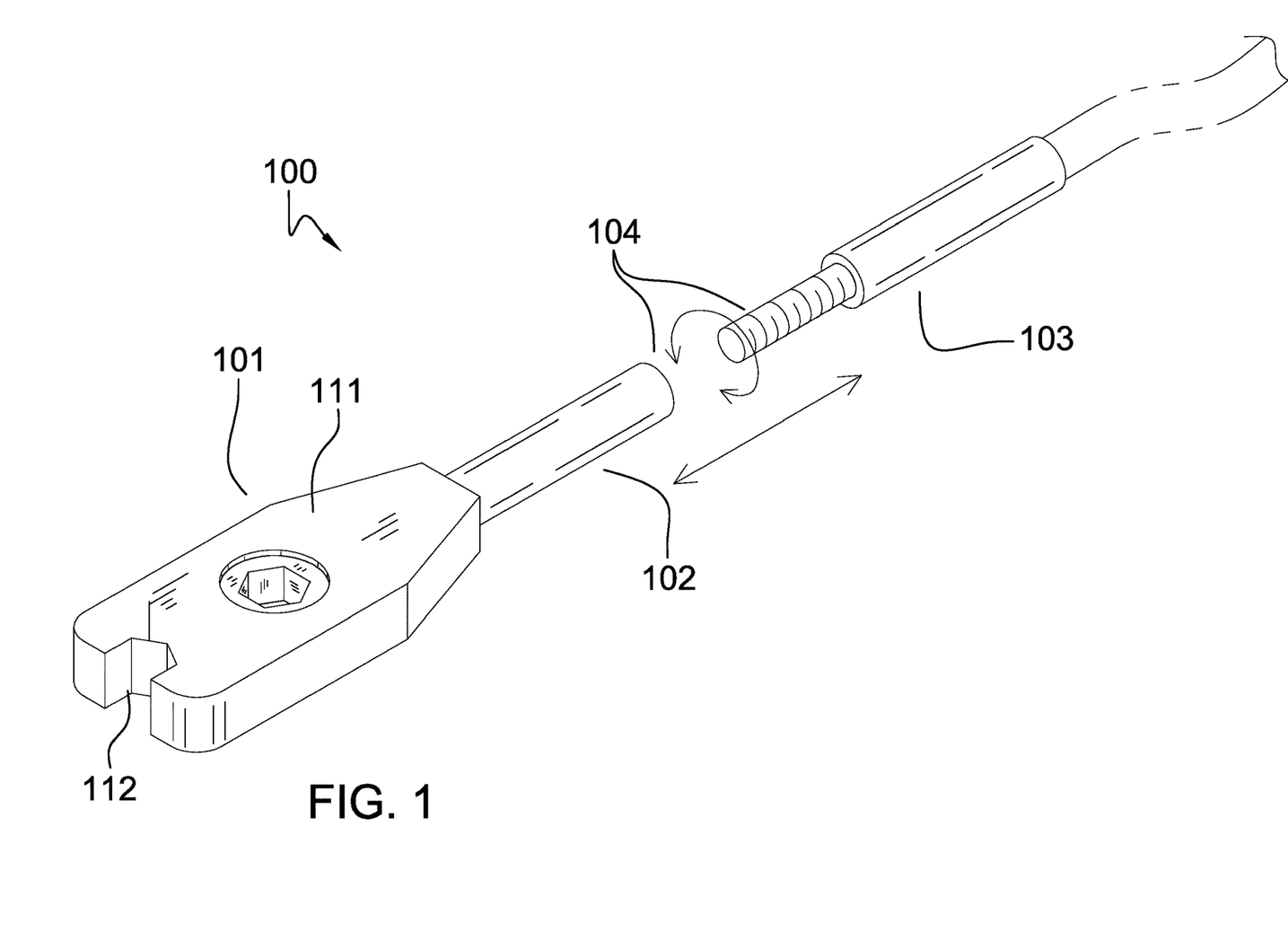
FIG. 1 is a perspective view of an embodiment of the disclosure.
Figure 2:
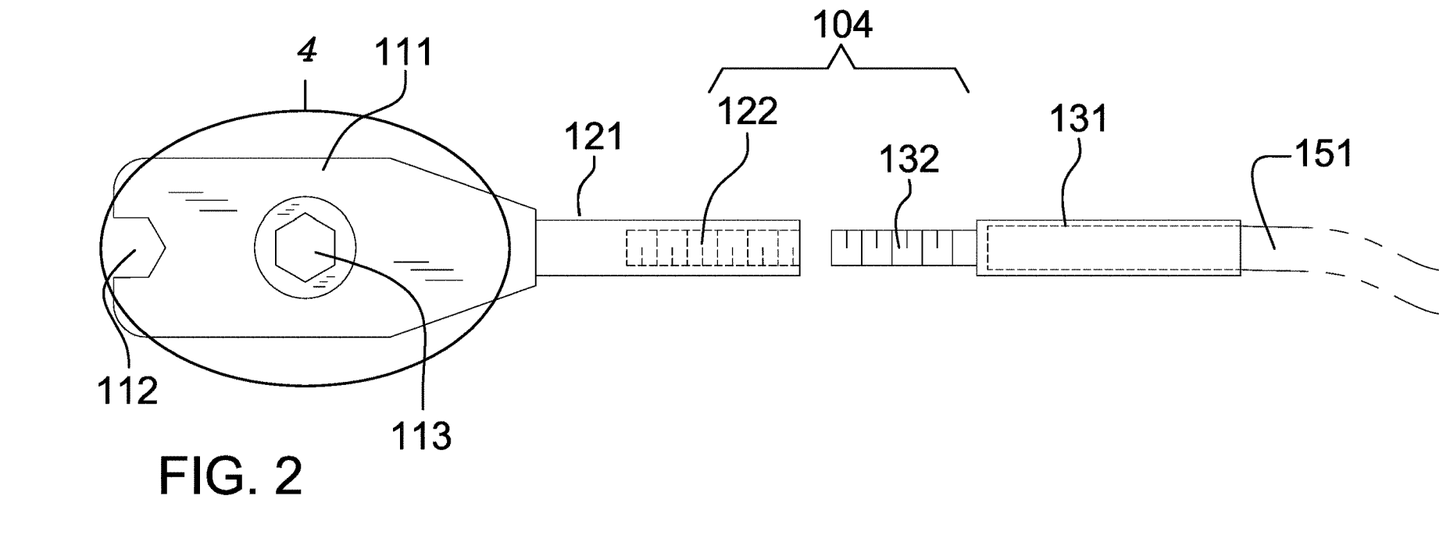
FIG. 2 is a front view of an embodiment of the disclosure.
Figure 3:
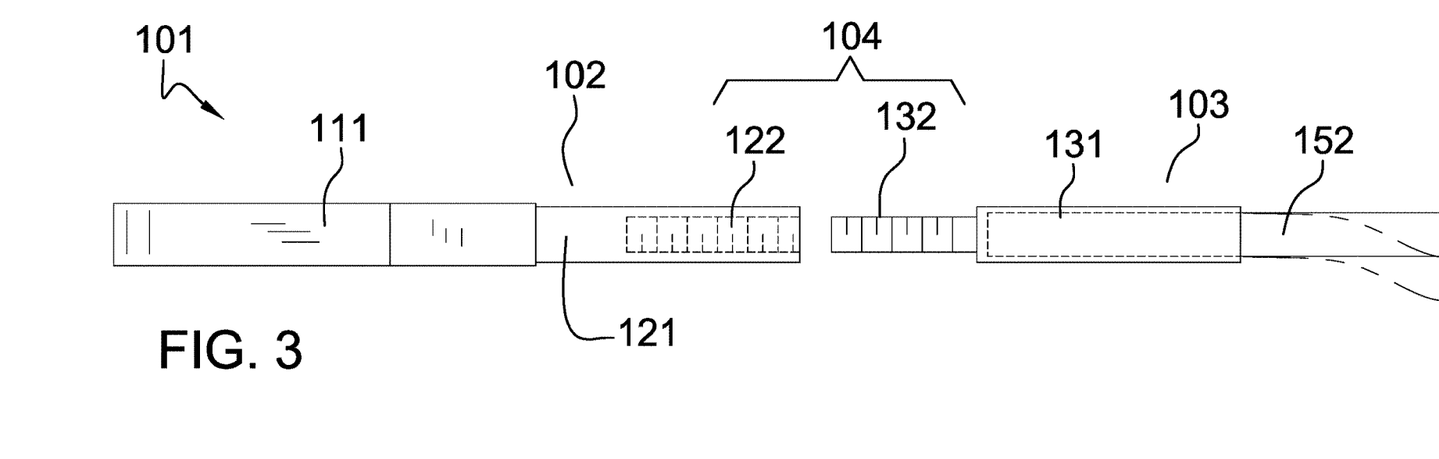
FIG. 3 is a side view of an embodiment of the disclosure.
Figure 4:
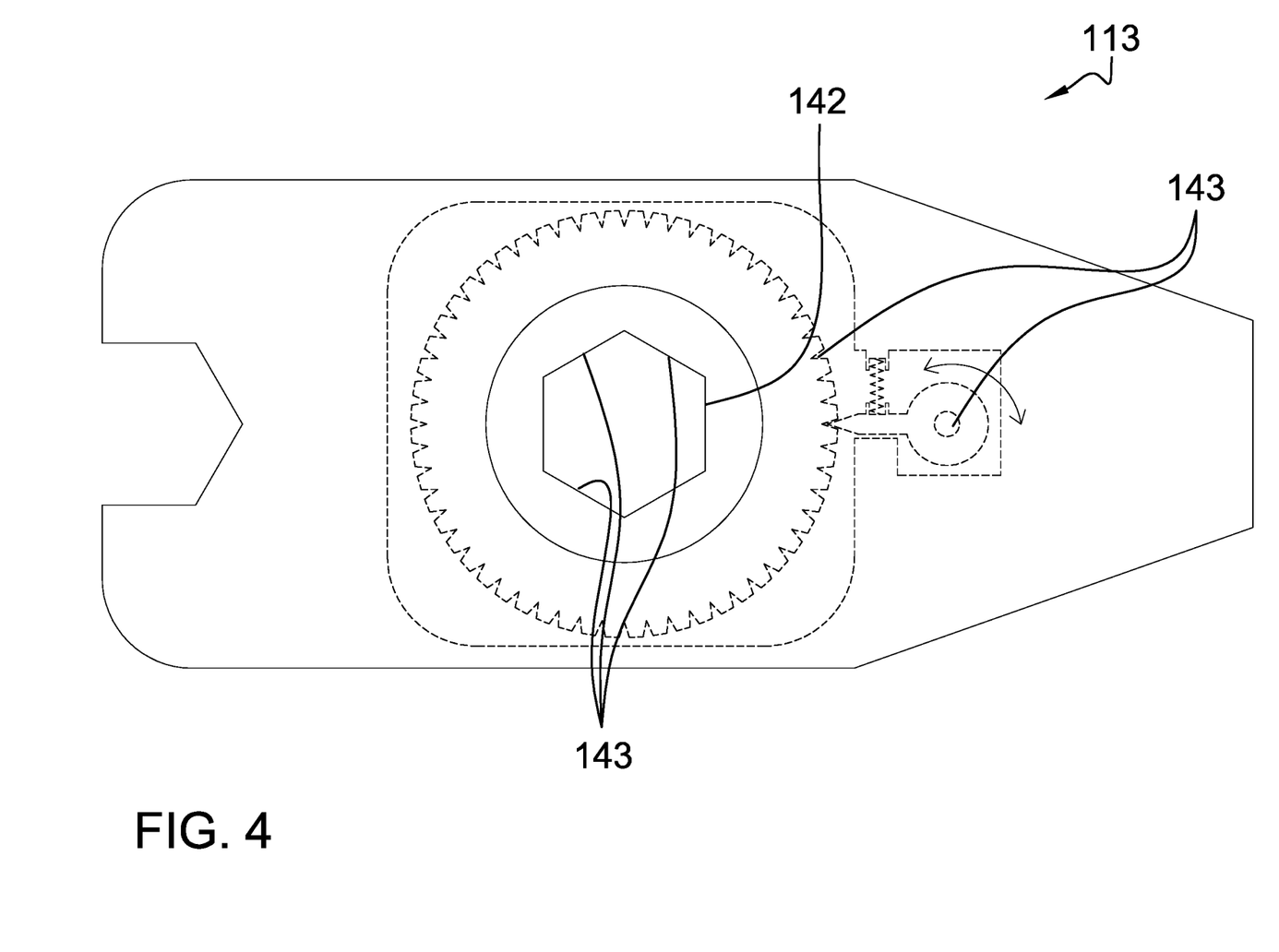
FIG. 4 is a detail view of an embodiment of the disclosure.
Figure 5:
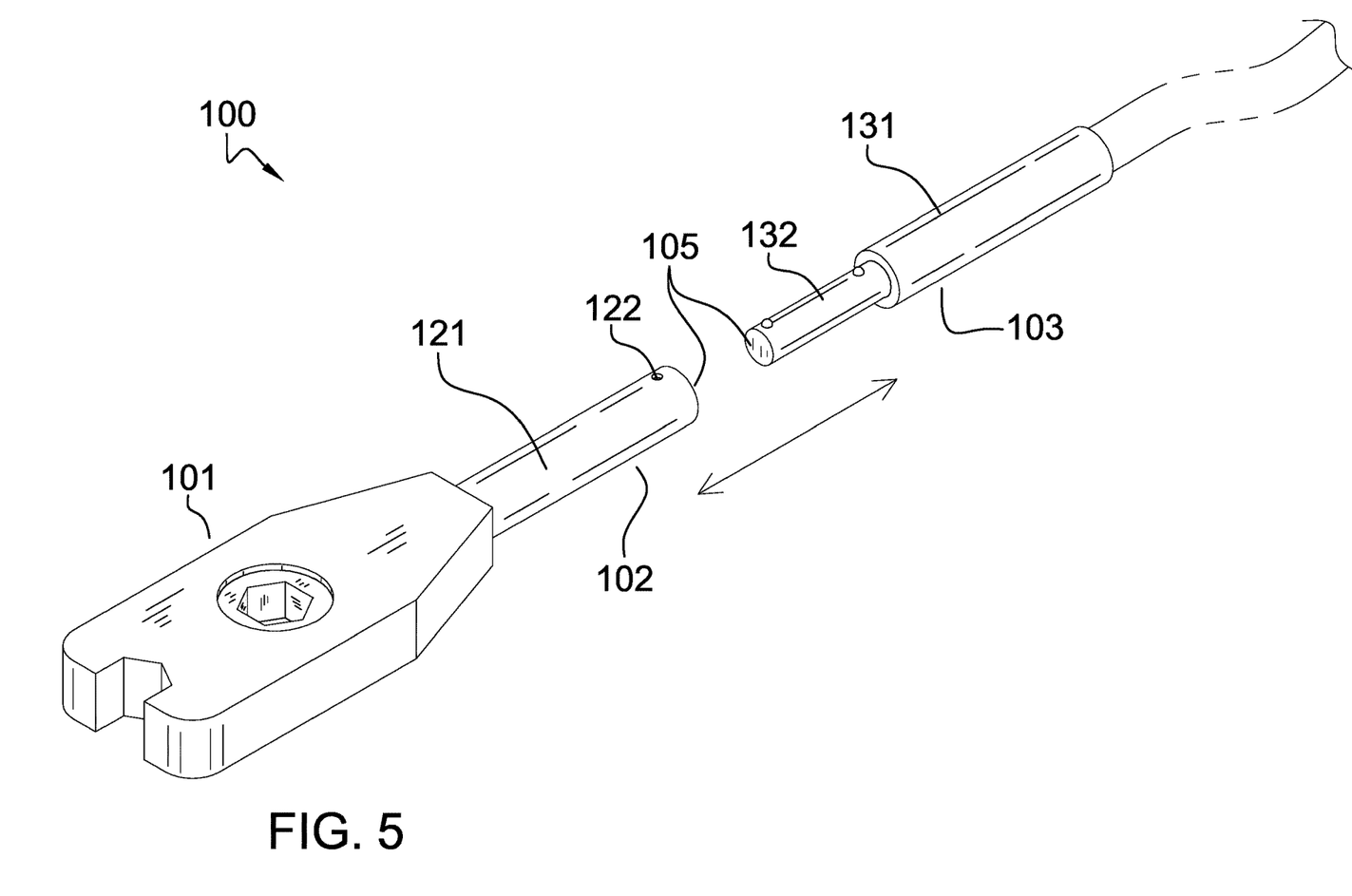
FIG. 5 is a perspective view of an alternate embodiment of the disclosure.
Figure 6:
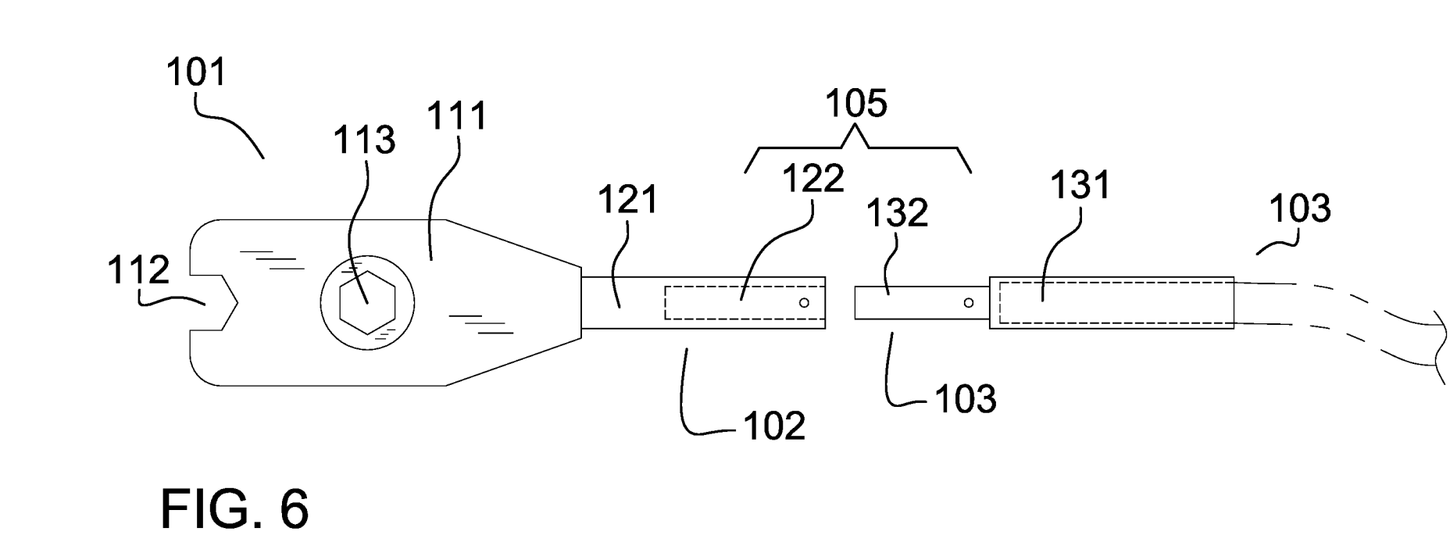
FIG. 6 is a front view of an alternate embodiment of the disclosure.
Figure 7:
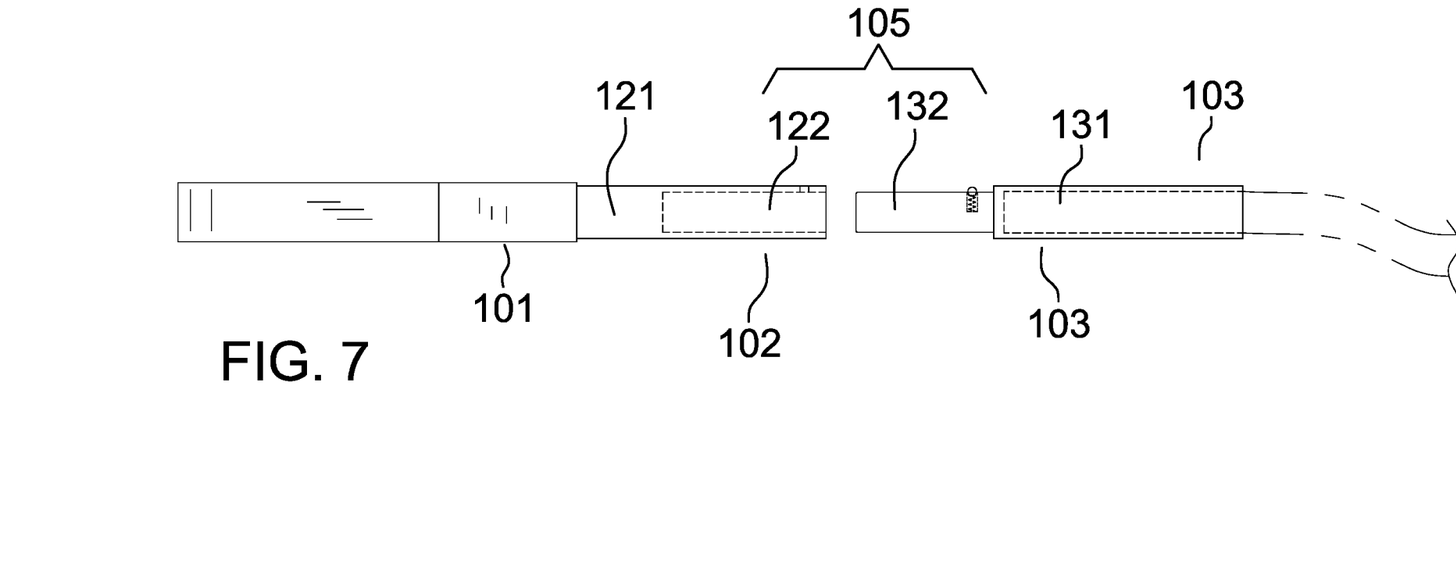
FIG. 7 is a side view of an alternate embodiment of the disclosure.

Detailed reference will now be made to one or more potential embodiments of the disclosure, which are illustrated in FIGS. 1 through 7.

The combined battery jumper cable with wrench 100 (hereinafter invention) is a tool. The invention 100 is configured for use with a vehicle battery. The invention 100 forms an electric termination that attaches an electric cable 151 to a terminal post of the vehicle battery. The invention 100 forms a ratchet that is used to attach an electrical terminal of the vehicle to the terminal post of the vehicle battery. The invention 100 comprises a working head 101, a transfer mount 102, and a motive structure 103. The transfer mount 102 attaches the motive structure 103 to the working head 101. The working head 101 is the working element of the tool. The motive structure 103 transfers externally provided energy to the working head 101 through the transfer mount 102. The motive structure 103 removably attaches to the transfer mount 102. The motive structure 103 is selected from the group consisting of the electric cable 151 and the motive lever 152. The electric cable 151 is interchangeable with the motive lever 152.

The working head 101 is the working element of the invention 100. The working head 101 receives externally provided energy from the motive structure 103. The working head 101 transmits electrical energy into a vehicle battery when the selected motive structure 103 is an electric cable 151. The working head 101 transmits mechanical energy required to attach an electrical terminal to the vehicle battery when the selected motive structure 103 is a motive lever 152. The working head 101 comprises a base prism 111, a wrench profile 112, and a ratchet assembly 113.

The base prism 111 is a prism-shaped structure. The base prism 111 is a disk-shaped structure. The base prism 111 is a rigid structure. The base prism 111 forms the primary shape of the working head 101. The wrench profile 112 is formed in the lateral face of the disk structure of the base prism 111. The ratchet assembly 113 mounts in the interior of the base prism 111.

The wrench profile 112 is a notch that is formed in the lateral face of the disk structure of the base prism 111. The wrench profile 112 is sized to receive a nut used to secure an electric terminal to the terminal post of a vehicle battery. The wrench profile 112 mechanically rotates the nut to secure the electric terminal to the terminal post of a vehicle battery. The wrench and the profile associated with a wrench are defined elsewhere in this disclosure.

The ratchet assembly 113 is a ratchet that is installed in the base prism 111. The ratchet assembly 113 is configured to receive a socket wrench such that the socket wrench is able to rotate the wrench profile 112 to tighten or loosen a nut. The ratchet assembly 113 comprises a hex socket 141, a ratchet mechanism 142, and a conductive surface 143.

The hex socket 141 is negative space formed through the congruent ends of the disk structure of the base prism 111. The hex socket 141 has a prism-shaped structure. The hex socket 141 has a disk-shaped structure. The center axis of the hex socket 141 aligns with the center axis of the base prism 111. The perimeter of the negative space formed by the hex socket 141 is coated with a conductive surface 143 such that the working head 101 forms an electric connection with the vehicle battery through the hex socket 141. The hex socket 141 is sized such that the terminal post of the vehicle battery will insert into the hex socket 141 such that externally provided electric energy delivered from the motive structure 103 through the transfer mount 102 will flow into the vehicle battery through the conductive surface 143 of the hex socket 141. The form factor of the hex socket 141 is sized such that the hex socket 141 will receive an externally provided socket wrench.

The ratchet mechanism 142 is a ratchet that mounts in the hex socket 141. The ratchet mechanism 142 is mechanically driven using the socket wrench. In the first potential embodiment of the disclosure, the base prism 111 is rotated by the motive tool 131 such that the wrench profile 112 of the working head 101 will tighten and loosen a nut. Alternately, in the first potential embodiment of the disclosure, the rotation of the socket wrench in the hex socket 141 will drive the ratchet mechanism 142 such that the wrench profile 112 of the working head 101 will tighten and loosen a nut. Techniques to design and use a ratchet mechanism 142 are well-known and documented in the mechanical arts.

The conductive surface 143 is an electrically conductive structure that transmits externally provided electrical energy into the vehicle battery.

The transfer mount 102 is an inert mechanical structure. The transfer mount 102 permanently attaches to the working head 101. The transfer mount 102 attaches to the motive structure 103 using a fastening structure selected from the group consisting of a threaded connection 104 and a mechanical detent 105. The motive structure 103 screws into the transfer mount 102 using the threaded connection 104. The threaded connection 104 is defined elsewhere in this disclosure. The mechanical detent 105 secures the motive structure 103 to the transfer mount 102 once the motive structure 103 inserts into the transfer mount 102. The transfer mount 102 comprises a transfer prism 121 and a transfer fitting 122.

The transfer prism 121 is a prism-shaped structure. The transfer prism 121 is a hollow structure. The transfer prism 121 is a rigid structure. A congruent end of the transfer prism 121 permanently attaches to the lateral face of the prism structure of the base prism 111. The congruent end of the prism structure of the transfer prism 121 that is distal from the base prism 111 attaches to the motive structure 103 such that the externally provided energy provisioned through the motive structure 103 is received by the transfer prism 121. The transfer prism 121 is an electrically conductive structure that transmits externally provided electrical energy from the motive structure 103 to the working head 101. The transfer prism 121 is a rigid structure that transmits externally provided mechanical energy from the motive structure 103 to the working head 101.

The transfer fitting 122 is the mechanical structure that attaches the motive structure 103 to the transfer mount 102. The transfer fitting 122 is configured to allow the motive structure 103 to insert into the congruent end of the prism structure of the transfer prism 121 that is distal from the base prism 111 of the working head 101. The transfer fitting 122 is selected from the group consisting of a threaded connection 104 and a mechanical detent 105.

The motive structure 103 is a device that transmits the externally provided energy to the working head 101 through the transfer mount 102. The motive structure 103 attaches to the transfer mount 102 using a fastening structure selected from the group consisting of a threaded connection 104 and a mechanical detent 105. The motive structure 103 screws into the transfer mount 102 using the threaded connection 104. The threaded connection 104 is defined elsewhere in this disclosure. The mechanical detent 105 secures the motive structure 103 to the transfer mount 102 once the motive structure 103 inserts into the transfer mount 102. The motive structure 103 comprises a motive tool 131 and a motive fitting 132.

The motive tool 131 is a structure that transfers externally provided energy in the form of electrical energy to the transfer prism 121 of the transfer mount 102. The motive tool 131 is a structure that transfers externally provided energy in the form of mechanical energy to the transfer prism 121 of the transfer mount 102. The motive tool 131 is selected from the group consisting of an electric cable 151 and a motive lever 152.

The electric cable 151 is an electrical cable that attaches to the transfer fitting 122 of the transfer prism 121. The electric cable 151 transmits an externally provided source of electrical energy into the transfer mount 102. The motive lever 152 is a prism-shaped shaft that attaches to the transfer fitting 122 of the transfer prism 121. The motive lever 152 transmits an externally provided source of mechanical rotational energy into the transfer mount 102.

The motive fitting 132 is the mechanical structure that attaches the motive structure 103 to the transfer mount 102. The motive fitting 132 is configured such that the motive structure 103 inserts into the congruent end of the prism structure of the transfer prism 121 that is distal from the base prism 111 of the working head 101. The motive fitting 132 is selected from the group consisting of a threaded connection 104 and a mechanical detent 105.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Aperture: As used in this disclosure, an aperture is a prism-shaped negative space that is formed completely through a structure or the surface of a structure.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hex Socket: As used in this disclosure, a hex socket is a cylindrical pipe that is designed to receive the head of a hexagonal fastening device such as a bolt or a nut. The hex socket fits over and secures the hexagonal fastening device such that the hex socket can rotate the hexagonal fastening device to create or disconnect a threaded connection. Hexagonal fastening devices are also referred to as six point fasteners or hexagonal sockets. Always use socket and socket wrench.

Inert: As used in this disclosure, inert is an adjective that is applied to an object, system, or chemical reaction. Inert means that the object, system, or chemical reaction is incapable of internal motion, internal activity, or is otherwise unreactive.

Lever: As used in this disclosure, a lever is a simple machine that comprises a shaft that rotates around a fulcrum, axis of rotation, or pivot point.

Negative Space: As used in this disclosure, negative space is a method of defining an object through the use of open or empty space as the definition of the object itself, or, through the use of open or empty space to describe the boundaries of an object.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pawl: As used in this disclosure, a pawl is a rotating bar or lever with a free end that engages a toothed structure.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Ratchet: As used in this disclosure, a ratchet is a device comprising a pawl or hinged catch that engages the sloping teeth of a wheel or bar permitting motion in one direction only.

Rigid Structure: As used in this disclosure, a rigid structure is a solid structure formed from an inelastic material that resists changes in shape. A rigid structure will permanently deform as it fails under a force.

Simple Machine: As used in this disclosure, a simple machine refers to a device that consists of a mechanism selected from the group consisting of: 1) an inclined plane, 2) a lever; 3) a pivot, 4) a pulley, 5) a screw, 6) a spring, 7) a wedge, and 8) a wheel (including axles). A compound machine is a device that consists of a plurality of mechanisms selected from the group consisting of the simple machine.

Socket: As used in this disclosure, a socket is an opening or a cavity that acts as a receptacle for an inserted part.

Socket Wrench: As used in this disclosure, a socket wrench is a tool that is used to drive the rotation of a hardware item into a threaded connection. A socket wrench comprises a series of interchangeable structures, called sockets, and a handle. The socket fits over the hardware item. The handle provides leverage that allows the handle to rotate the socket and the hardware item. The connection of the socket to the handle is typically fitted with a ratchet. An example of a hardware item suitable for use with a socket wrench includes, but is not limited to, a bolt being driven into a nut. A hex socket is a common example of the type of socket used on a socket wrench. The handle of the socket wrench comprises a drive fitting that inserts into a port formed on each interchangeable socket to connect the socket into the handle.

Teeth: As used in this disclosure, the teeth refer to a plurality of working elements of a tool that interact with a pawl or with other teeth to perform the function of the tool. The teeth found on gears is a common example of the use of teeth. An individual working element selected form the plurality of working elements is called a tooth.

Terminal: As used in this disclosure, a terminal is the end point of a conductor. A terminal can be the conducting wire itself or may have attached to is a device designed to facilitate an electrical connection. The terminal is also called a termination.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Tool: As used in this disclosure, a tool is a device, an apparatus, or an instrument that is used to carry out an activity, operation, or procedure.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

Working Element: As used in this disclosure, the working element of a tool is the physical element on the tool that performs the actual activity, operation, or procedure the tool is designed to perform. For example, the cutting edge of a blade is the working element of a knife.

Wrench: As used in this disclosure, a wrench is a tool that used to rotate a specified structure around an axis of rotation that is aligned with the center axis of the selected structure. The specified structure is selected from the group consisting of a prism and a composite prism. The wrench comprises a working element and a lever. The working element attaches to the selected structure such that the lever can rotate the selected structure. The working element of the wrench is often called the head. The portion of the working head that contacts the selected structure is called the profile. The lever is often called the handle.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A combined jumper cable and wrench comprising a working head, a transfer mount, and a motive structure;
the working head comprising a ratchet assembly defining a hex socket, the working head further comprising a wrench profile and a base prism, wherein the ratchet assembly mounts in an interior of the base prism; wherein the wrench profile is a notch that is formed at a distal end in a lateral face of a disk structure of the base prism to form an open end wrench; wherein the transfer mount detachably attaches the motive structure to the working head; wherein the motive structure comprises an electric cable; wherein the combined jumper cable and wrench forms an electrical termination that attaches the motive structure, to a terminal post of a vehicle battery; wherein the combined jumper cable and wrench is used to attach an electrical terminal of the vehicle to the terminal post of the vehicle battery; and wherein the hex socket defines a conductive surface that once inserted onto the post of the vehicle battery transmits externally provided electrical energy into the vehicle battery.

2. The combined jumper cable and wrench according to claim 1 wherein the working head is the working element of the combined jumper cable and wrench.

3. The combined jumper cable and wrench according to claim 2 wherein the transfer mount is attached to the working head; wherein the transfer mount attaches to the motive structure using a fastening structure selected from the group consisting of a threaded connection and a mechanical detent; wherein the motive structure screws into the transfer mount using the threaded connection; wherein the mechanical detent secures the motive structure to the transfer mount once the motive structure inserts into the transfer mount.

4. The combined jumper cable and wrench according to claim 3 wherein the transfer mount comprises a transfer prism and a transfer fitting; wherein the transfer fitting is a portion of the fastening structure that attaches the motive structure to the transfer mount; wherein the transfer fitting is configured to allow the motive structure to insert into the congruent end of the prism structure of the transfer prism that is distal from the base prism of the working head.

5. The combined jumper cable and wrench according to claim 4 wherein the motive structure comprises a motive tool and a motive fitting; wherein the motive fitting is another portion of the fastening structure that attaches the motive structure to the transfer mount; wherein the motive fitting is configured such that the motive structure inserts into the congruent end of the prism structure of the transfer prism that is distal from the base prism of the working head.

6. The combined jumper cable and wrench according to claim 5 wherein the base prism is a rigid structure; wherein the base prism forms the primary shape of the working head.

7. The combined jumper cable and wrench according to claim 6 wherein the wrench profile is sized to receive a nut used to secure an electric terminal to the terminal post of a vehicle battery; wherein the wrench profile mechanically rotates the nut to secure the electric terminal to the terminal post of a vehicle battery.

8. The combined jumper cable and wrench according to claim 7 wherein the hex socket is negative space formed through the congruent ends of the disk structure of the base prism; wherein the hex socket has a disk-shaped structure; wherein the center axis of the hex socket aligns with the center axis of the base prism; wherein the perimeter of the negative space formed by the hex socket is coated with The conductive surface.

9. The combined jumper cable and wrench according to claim 8 wherein the transfer prism is a prism-shaped structure; wherein the transfer prism is a hollow structure; wherein the transfer prism is a rigid structure.

10. The combined jumper cable and wrench according to claim 9 wherein a congruent end of the transfer prism permanently attaches to the lateral face of the prism structure of the base prism; wherein the congruent end of the prism structure of the transfer prism that is distal from the base prism attaches to the motive structure such that the externally provided energy provisioned through the motive structure is received by the transfer prism; wherein the transfer prism is a rigid structure that transmits externally provided mechanical energy from the motive structure to the working head; wherein the transfer fitting is selected from the group consisting of a threaded connection and a mechanical detent.

\* \* \* \* \*